United States Patent [19]

Suzuyama et al.

[11] Patent Number: 4,651,255

[45] Date of Patent: Mar. 17, 1987

[54] CONNECTING SYSTEM FOR GAS-INSULATED SWITCHGEAR APPARATUS

[75] Inventors: Hiroshi Suzuyama; Minoru Sakaguchi, both of Hitachi, Japan

[73] Assignee: Hitachi, Ltd., Tokyo, Japan

[21] Appl. No.: 758,031

[22] Filed: Jul. 23, 1985

[30] Foreign Application Priority Data

Jul. 25, 1984 [JP] Japan ................... 59-153074

[51] Int. Cl.⁴ .............................. H02B 1/20
[52] U.S. Cl. ........................ 361/341; 361/333; 174/37; 307/147
[58] Field of Search ............... 361/332, 333, 335, 341, 361/429; 174/37; 200/48 R, 148 B; 307/147

[56] References Cited

U.S. PATENT DOCUMENTS

| | | | |
|---|---|---|---|
| Re. 19,797 | 12/1935 | Rossman | 361/333 |
| 1,878,107 | 9/1932 | Burnham | 361/333 |
| 3,639,673 | 2/1972 | Fugisaki | 307/147 |
| 4,141,054 | 2/1979 | Colaiaco | 361/341 |

FOREIGN PATENT DOCUMENTS 2711 12/1981 Japan.
70015 12/1983 Japan.

Primary Examiner—G. P. Tolin
Attorney, Agent, or Firm—Antonelli, Terry & Wands

[57] ABSTRACT

A novel connecting system for a gas-insulated switchgear apparatus is disclosed. An electrical device is installed on a foundation adjacent to gas-insulated devices of respective phases in a predetermined indoor installation space, and bushing are arranged on the other side of the electrical device. The gas-insulated devices are connected to the bushings by gas-insulated bus bars respectively. Pits for gas-insulated bus bars are formed independently through the foundation of the electrical device, and a transport unit is laid in each of the pits. This transport unit is combined with a transfer unit mounted on each of the gas-insulated bus bars to transport the gas-insulated bus bars of respective phases to facilitate the laying thereof. The gas-insulated bus bars are thus laid in a short distance without reducing the strength of the foundation of the electrical device while at the same time facilitating the laying of the gas-insulated bus bars.

10 Claims, 6 Drawing Figures

CONNECTING SYSTEM FOR GAS-INSULATED SWITCHGEAR APPARATUS

BACKGROUND OF THE INVENTION

The present invention relates to a connecting system for a gas-insulated switchgear apparatus, or more in particular to a construction in which the connecting system is arranged on the side of an electrical device installed adjacently to the gas-insulated switch-gear apparatus.

Generally, in a power generation plant or a power substation, gas-insulated devices such as a gas-insulated switchgear apparatus of respective phases including a gas-insulated circuit breaker and a disconnector are installed on one side of a partition wall or within a building at a predetermined place of installation, and an electrical device such as a transformer or a reactor is arranged adjacently to such gas-insulated devices. Each of the gas-insulated devices of respective phases, on the other hand, is provided with a bushing for connection with a transmission line or other electrical devices through a connection cable. This bushing, for convenience of external connection or installation of the electrical device, is sometimes arranged unavoidably on the other side of the gas-insulated devices opposite to the electrical device side, that is, on the installation side of the electrical device. In such a case, gas-insulated bus bars used for connection between the gas-insulated devices of respective phases and the bushings are laid in according to a selected one of the methods mentioned below. A first method is for the bus bars to circumvent the electrical device installed on a foundation, and a second method is by laying the bus bars through the foundation part of the installed electrical device. The first method of laying the bus bars, in which the gas-insulated bus bars circumvent the electrical device, has the disadvantage of a great length over which the bus bars are laid. In the second method, in contrast, the mechanical strength of the foundation of the electrical device is required to be increased on the one hand, and small-size bus bar units split up are connected as it is impossible to lay integrated gas-insulated bus bars through the foundation, thereby making it necessary to enlarge the working underground pit on the other hand. To increase the strength of the foundation of a heavy-duty electrical device while realizing such a spatial need at the same time, however, is practically impossible.

To solve this problem, a suggestion has so far been made of a method to lay gas-insulated bus bars connecting the gas-insulated devices and bushings without affecting the installation of the electrical device.

U.S. Pat. No. 3,639,673 is well known for its disclosure of an example of laying gas-insulated bus bars in the ground. Japanese Utility Model Unexamined Publication No. 70015/83, on the other hand, discloses a method in which gas-insulated devices arranged in a building and an electrical device installed outside of the building are connected by gas-insulated bus bars laid in a pit formed in the ground. Further, a support construction for the bushing generally used with a gas-insulated device is disclosed in Japanese Utility Model Unexamined Publication No. 2711/81.

SUMMARY OF THE INVENTION

An object of the present invention is to provide a connecting system for a gas-insulated switchgear apparatus by which gas-insulated bus bars are laid over the shortest length by taking advantage of the foundation of an electrical device installed between the gas-insulated devices and bushings for connection with an external device without reducing the mechanical strength of the foundation.

Another object of the present invention is to provide a connecting system for a gas-insulated switchgear apparatus which permits the gas-insulated bus bars to be easily laid for connection of the gas-insulated devices and the gas-insulated bus bars and bushings.

According to the present invention, there is provided a connecting system for a gas-insulated switchgear apparatus in which gas-insulated devices of respective phases are installed in a predetermined installation space within a building or like, an electrical device is arranged on the foundation adjacent to the installation space of the gas-insulated devices, and bushings are provided on the side of the electrical device opposite to the side thereof facing the gas-insulated devices, wherein the gas-insulated devices of respective phases are connected with the bushings by way of independent pits formed for gas-insulated bus bars of respective phases through the foundation of the electrical device, each of the pits including transport means laid therein which are combined with transfer means of the gas-insulated bus bars to transport the gas-insulated bus bars into position, thereby connecting the bushings and the gas-insulated devices of respective phases by means of the gas-insulated bus bars.

DESCRIPTION OF THE PREFERRED EMBODIMENTS

Figure 1:
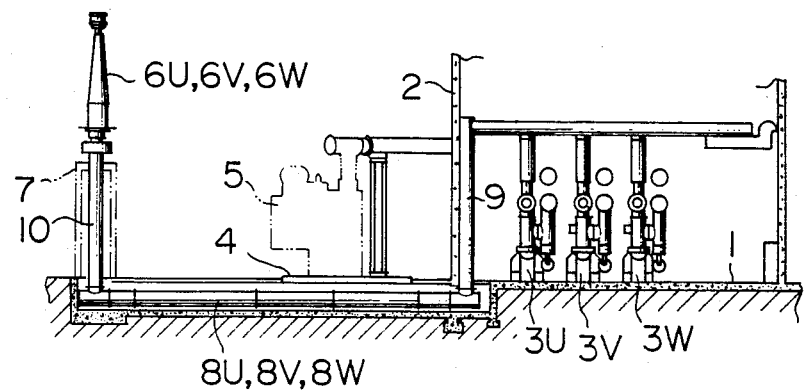
FIG. 1 is a schematic diagram showing a connecting system for a gas-insulated switchgear apparatus according to the present invention.

A connecting system for a gas-insulated switchgear apparatus according to the present invention is constructed as shown in FIG. 1. Specifically, gas-insulated devices of respective phases 3U, 3V, 3W making up a gas-insulated switch gear apparatus comprising circuit breakers, disconnectors and earth switches are arranged in an installation space in a building or defined by a side wall 2 of a power substation. A firm foundation 4 for installation is formed on the other side of the side wall 2 and has installed thereon a large-capacity, heavy-duty electrical device 5 such as a transformer or a reactor connected to the gas-insulated devices 3U, 3V, 3W. Bushings of respective phases 6U, 6V, 6W connected to external means such as a transmission line are supported on a common rest 7 and disposed at a point at a sufficient distance from the side of the electrical device 5 on the other side of the gas-insulated devices. These gas-insulated devices of respective phases 3U, 3V, 3W are connected to the bushings 6U, 6V, 6W by gas-insulated bus bars 8U, 8V, 8W laid underground as described later. In other words, when viewed from the gas-insulated devices 3U, 3V, 3W in that order, a vertically-arranged connecting bus bar 9 directed toward the installation space 1 is connected to the gas-insulated bus bars 8U, 8V, 8W laid underground, the other side of which is provided with vertical connecting bus bars 10 directed toward the rest 7. The vertical bus bars 10 are securely fixed with bushings 6U, 6V, 6W respectively.

Figure 2:
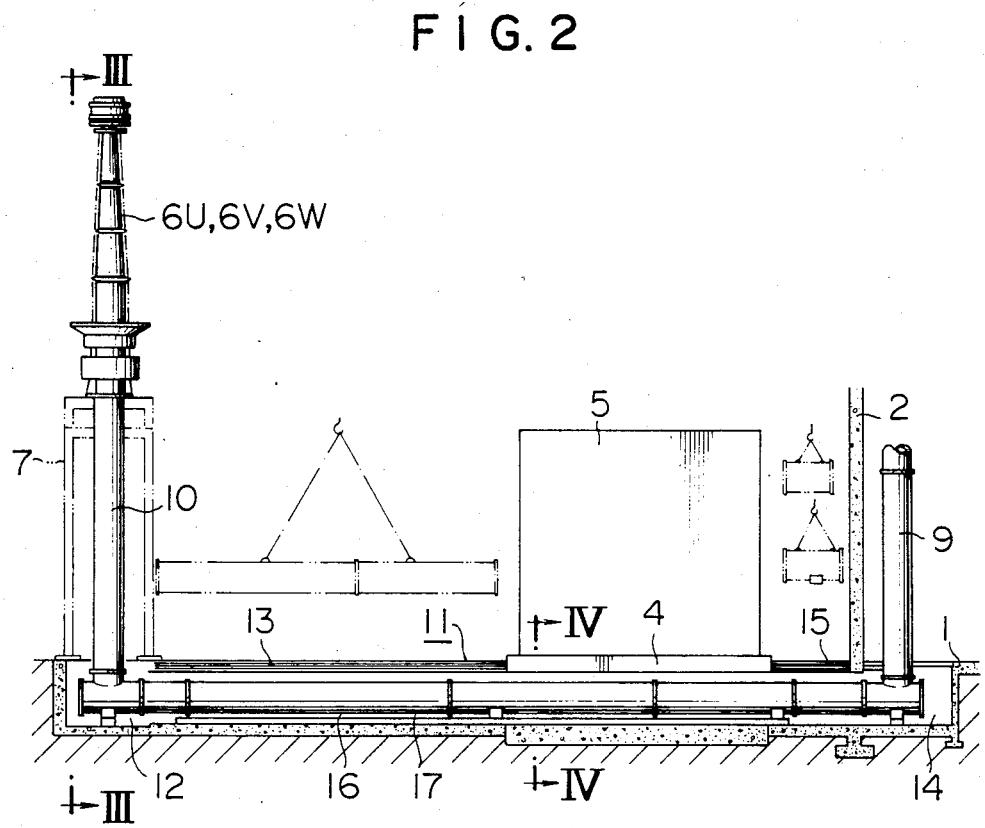
FIG. 2 is a partly-cutaway longitudinal sectional view showing the essential parts of the gas-insulated switchgear apparatus according to the present invention.
Figure 3:
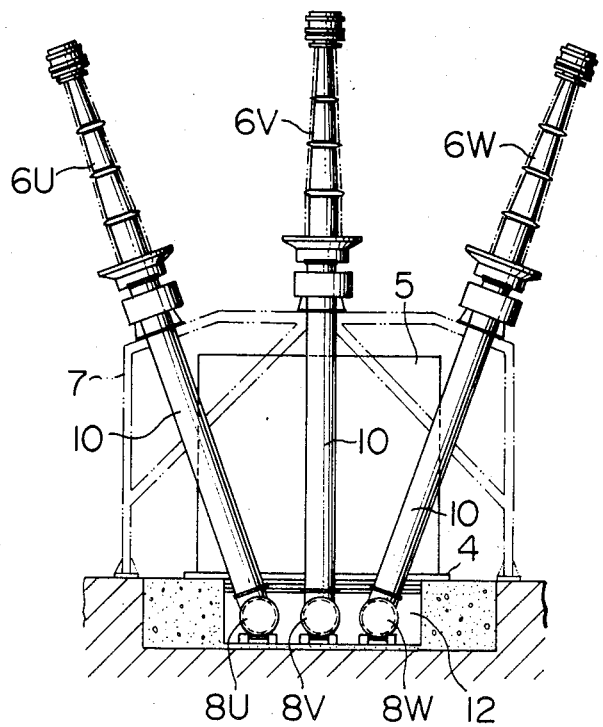
FIG. 3 is a sectional view taken in line III—III in FIG. 2.

A configuration and a method of laying of these gas-insulated bus bars 8U, 8V, 8W will be explained with reference to FIGS. 2 to 4.

In order to lay the gas-insulated bus bars 8U, 8V, 8W underground over the entire length from the installation space 1 of the gas-insulated devices to the installation point of the rest 7 of the bushings 6U, 6V, 6W, a pit 11 for accomodating them is formed. Under the foundation 4 of the electrical device, in particular, pit portions 11U, 11V, 11W of respective phases are formed independently of each other as shown in FIG. 4 to prevent the mechanical strength of the foundation 4 from decreasing. In the parts of the pit 11 other than under the foundation 4, where the pits may be provided independently for each phase, a three-phase common pit 12 is formed doubling as an entry port between the foundation 4 and the mounting base of the rest 7 as seen from FIG. 3. This common pit 12 is constructed so as to be closed up by a closing plate 13. In this embodiment of FIG. 2, another common pit 14 is formed between the foundation 4 and the installation space 1 and is closed hermetically by a closing plate. The common pits 12 and 14 are formed and used to facilitate the laying the gas-insulated bus bars split to a certain length and connected at flanges. Specifically, the gas-insulated bus bars split in small units or partly combined are suspended as shown in FIG. 2 and arranged within the common pits 12 and 14, in which other parts of the bus bars are connected to lay them sequentially, thereby facilitating a trouble-free assembly and laying work.

The common pits 12 and 14 are specially designed to facilitate the laying of the gas-insulated bus bars split up into small sizes. Specifically, each of the independent pit portions 11U, 11V, 11W of respective phases as well as the common pits 12, 14, has installed therein transport means 16 such as a rail member. Further, transfer means 17 such as a roller or other rotary member is mounted on the gas-insulated bus bars split up. The transport means 16 and transfer means 17 combine to facilitate the movement of the gas-insulated bus bars, thereby making it possible to lay them in position easily.

Figure 4:
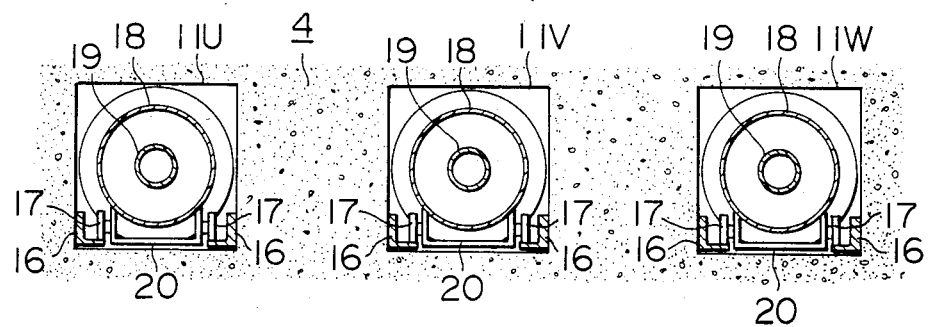
FIG. 4 is a sectional view taken in line IV—IV in FIG. 2.

FIG. 4 is a longitudinal sectional view showing the gas-insulated bus bars of respective phases 8U, 8V, 8W arranged in the pits of respective phases 11U, 11V, 11W passing through the foundation 4. An L-shaped transport means 16 is fixed on each of the longitudinal sides of each of the pits 11U, 11V, 11W, and transfer means 17 of roller type engaged with the means 16 is mounted on a cylindrical case 18 with a conductor 19 arranged therein for sealing an insulating gas, the transfer means 17 being disposed on the side of a channel shaped frame 20 secured to the lower surface of the case 18. In this construction, the gas-insulated bus bars of respective phases 8U, 8V, 8W may be laid with the transport means 16 closely attached to the sides of the pits 11U, 11V, 11W on the one hand, and the transfer means 17 engaged with the transport means 16 may be arranged utilizing the lower side of the bus bar case 18 with the result that the pits 11U, 11V, 11W may be reduced in size to a minimum required for the laying of the gas-insulated bus bars 8U, 8V, 8W on the other hand, thus permitting the foundation 4 of the electrical device to be constructed without adversely affecting the mechanical strength thereof.

Figure 5:
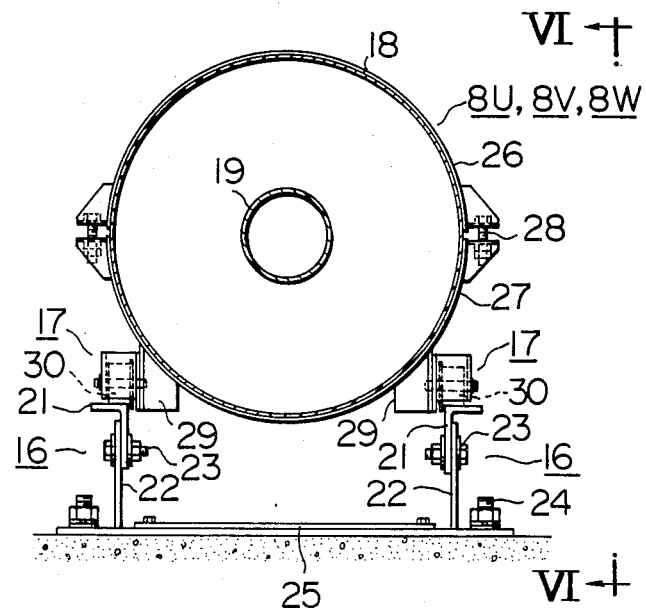
FIG. 5 is a longitudinal sectional view showing another example of a gas-insulated bus bar.
Figure 6:
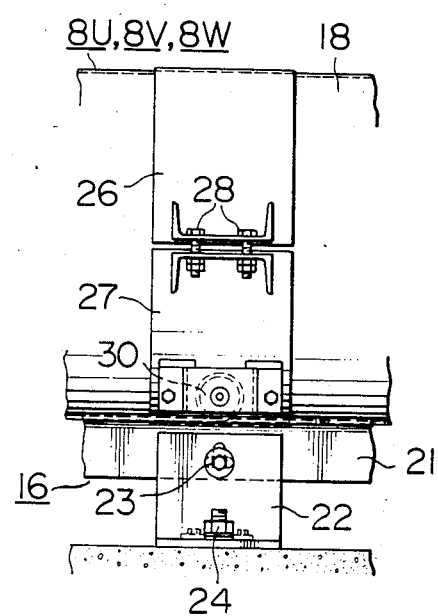
FIG. 6 is a side view taken as from the line VI—VI in FIG. 5.

Another example of the transport means provided in the pits and the transfer means mounted in the bus bar cases are shown in FIGS. 5 and 6.

The transport means 16 includes a couple of long L-shaped rail frames 21 which are supported by support members 22 coupled by bolts 23 at such an interval as to support the weight of the gas-insulated bus bars 8U, 8V, 8W. These support members 22 of course including reinforcing members fixed thereto as required, and are secured in position with anchor bolts 24 embedded in the pits. Numeral 25 designates a connecting plate for connecting the support members 22 arranged on both sides for positioning the rail frames 21. The transfer means 17 mounted on the bus bar case 18 in opposed relationship to the transport means 16 is preformed to provide easy placement. Specifically, the transfer means 17 includes arcuate frames 26, 27 split into at least upper and lower units fixed to the outer periphery of the bus bar case 18 with bolts 28, and seats 29 secured to the rail frames 21 in opposed relationship to the lower arcuate frame 27. Each seat 29 has a rotary member 30 such as a roller mounted thereon The transfer means shown in FIGS. 5 and 6, as compared with the one shown in FIG. 4, can be easily mounted on the bus bar case 18, and in addition, can be prefabricated to be replaceable, thereby greatly facilitating the mounting adjustment or change of position.

According to the present invention constructed as described above, gas-insulated devices of respective phases and bushings installed on the sides of an electrical device are connected over the shortest distance by use of gas-insulated bus bars laid in pits formed through the foundation of the electrical device without adversely affecting the mechanical strength of the foundation. Further, transport means arranged in pits combines with transfer means mounted in the case of the gas-insulated bus bars engaged with the transport means to facilitate the laying of the gas-insulated bus bars arranged in the pits from an entry port. At the same time, the axial change in size of the gas-insulated bus bars in operation is effectively absorbed by the slide of the transport and transfer means.

We claim:

1. A connecting system and a gas-insulated switchgear apparatus, comprising gas-insulated devices of respective phases installed in a predetermined installation space, an electrical device installed on a foundation formed on a side of said gas-insulated devices, bushings of respective phases supported on a rest on the other side of said electrical device opposite to said gas-insulated devices, and gas-insulated bus bars connecting the gas-insulated devices of respective phases and said bushings with the electrical device therebetween, said gas-insulated bus bars having cases, said system further comprising a plurality of independent pits formed within the foundation of said electrical device, each pit containing only gas insulated bus bar of a respective phase, and entry hatches receiving the gas-insulated bus bars, said entry hatches being formed in a predetermined size, transport means disposed in each of said pits for enabling laying of said gas-insualted bus-bars in said pits, and transfer means mounted on each of the cases of said gas-insulted bus bars of a predetermined length and disposed for engagement with said transport means, said gas-insulated bus bars being laid in the pits by cooperation of said transport means and said transfer means.

2. A connecting system according to claim 1, wherein said transport means includes a couple of rail embers arranged at predetermined intervals in each of said pits.

3. A connecting system according to claim 2, wherein said couple of rail members are supported at predetermined intervals on support members.

4. A connecting system according to claim 1, wherein said transfer means are rotary members mounted on the lower part of each case of the gas-insulated bus bars and are engaged with the transport means.

5. A connecting system according to claim 1, further comprising a substantially channel-shaped frame member secured to the lower surface of each of said cases of said gas-insulated bus bars, said transfer means being mounted on said frame member.

6. A connecting system according to claim 1, wherein said transport means includes a couple of rail members secured to the side walls of each of the pits of respective phases, and the transfer means mounted on each of the cases of the gas-insulated bus bars are engaged with said transport means.

7. A connecting system according to claim 1, further comprising at least two arcuate frame members replaceably mounted on each of the cases of the gas-insulated bus bars at predetermined intervals, said transfer means being secured to said arcuate frame members.

8. A connecting system according to claim 1, wherein said entry hatches have a common shape and communicate with the pits of respective phases, each of said entry hatches including a closing plate closed after delivery of the gas-insulated bus bars of the predetermined length.

9. A connecting system and a gas-insulted switchgear apparatus, comprising gas-insulated devices of respective phases installed in a predetermined installation space, an electrical device installed on a foundation formed on a side of said gas-insulated devices, bushings of respective phases supported on a rest on the other side of said electrical device opposite to said gas-insulated devices, and gas-insulated bus bars connecting the gas-insulated devices of respective phases and said bushings with the electrical device therebetween, said gas-insulated bus bars having bases, said system further comprising a plurality of independent pits containing said gas-insulated bus bars of respective phases and formed within the foundation of said electrical device, and entry hatches receiving the gas-insulated bus bars, said entry hatches being formed in a predetermined size, transport means disposed in each of said pits for enabling laying of said gas-insulated bus-bars in said pits, said transport means including a couple of rail members arranged at predetermined intervals in each of said pits, and transfer means mounted on each the cases of said gas-insulated bus bars of a predetermined length and disposed for engagement with said transport means, said transport means being rotary members mounted on the lower part of each case of the gas-insulated bus bars and being engaged with said transport means, said gas-insulated bus bars being laid in said pits by cooperation of said transport means and said transfer means.

10. A connecting system and a gas-insulated switchgear apparatus, comprising a gas-insulated devices of respective phases installed in a predetermined installation space, an electrical device installed on a foundation formed on a side of said gas-insulated devices, bushings of respective phases supported on a rest on the other side of said electrical device opposite to said gas-insulated devices, and gas-insulated bus bars connecting the gas-insulated devices of respective phases and said bushings with the electrical devices therebetween, said gas-insulated bus bars having cases, said system further comprising a plurality of indpendent pits formed within the foundation of said electrical device, each pit containing only one gas insulated bus bar of a respective phase, and entry hatches receiving the gas-insulated bus bars, said entry hatches being formed in a predetermined size, transport means disposed in each of said pits for enabling laying of said gas-insulated bus-bars in said pits, said transport means including a coupled of rail members arranged at predetermined intervals in each of said pits, a substantially channel-shaped frame member secured to the lower surface of each of the cases of said gas-insulated bus bars, and transfer members mounted on said frame member and disposed for engagement with said transport means, said gas-insulated bus bars being laid in said pits by cooperation of said transport means and said transfer means.

* * * * *